No. 628,806. Patented July 11, 1899.
W. S. HORRY.
METHOD OF PRODUCING CARBID OF CALCIUM.
(Application filed Apr. 19, 1898.)
(No Model.) 2 Sheets—Sheet 1.
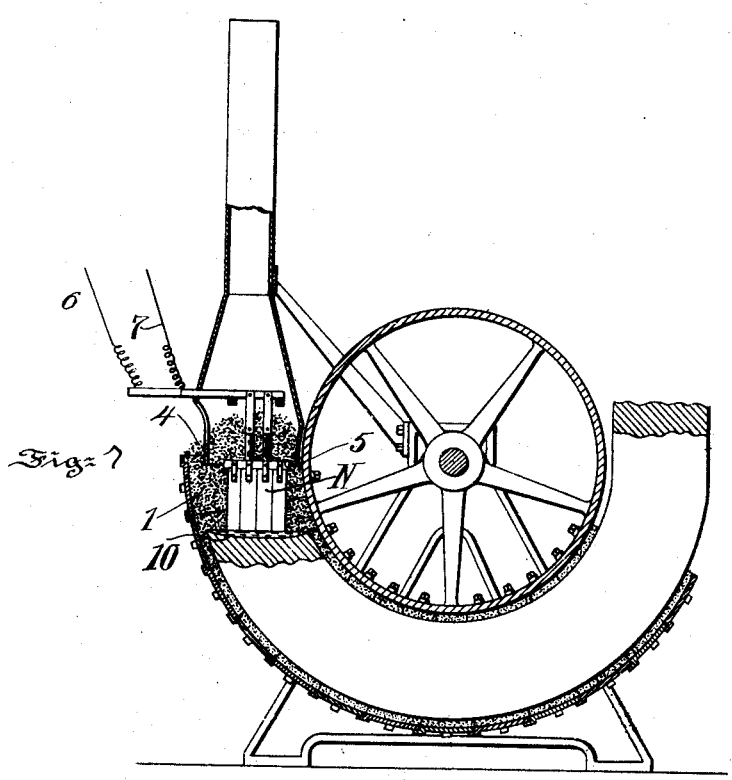
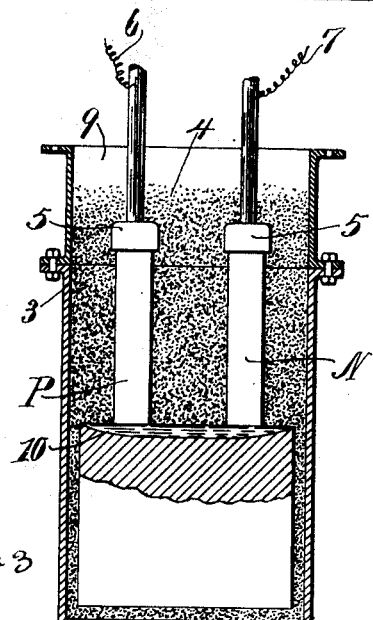

No. 628,806. Patented July 11, 1899.
W. S. HORRY.
METHOD OF PRODUCING CARBID OF CALCIUM.
(Application filed Apr. 19, 1898.)
(No Model.) 2 Sheets—Sheet 2.
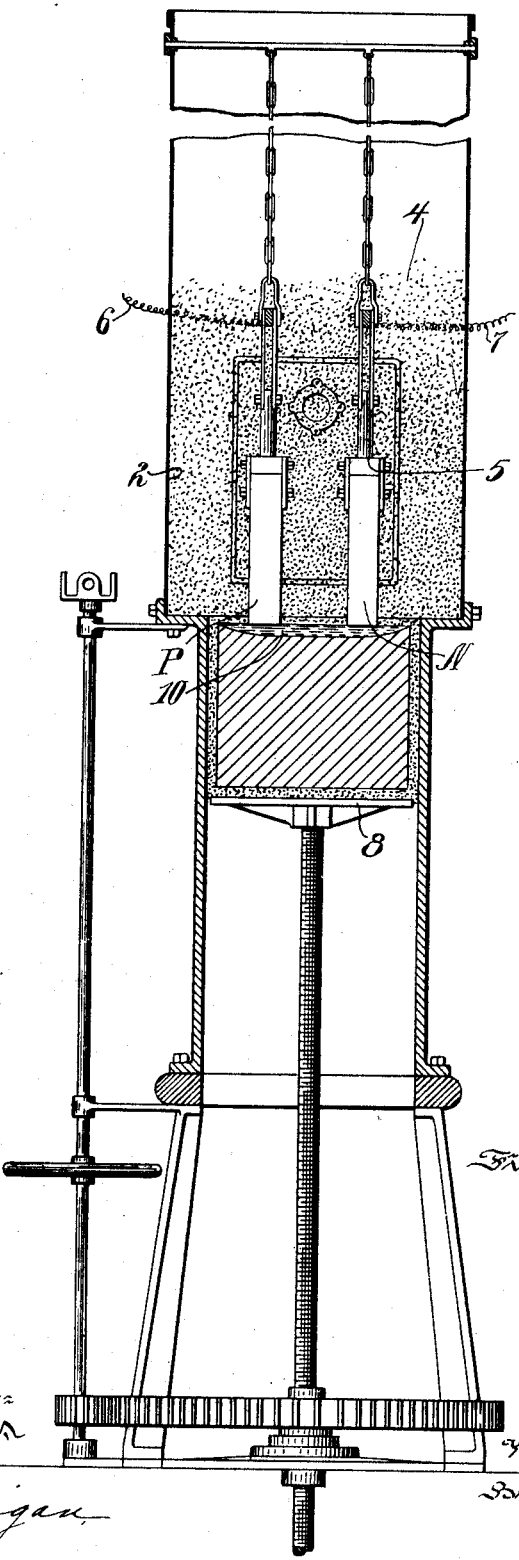

UNITED STATES PATENT OFFICE.

WILLIAM SMITH HORRY, OF SAULT STE. MARIE, MICHIGAN, ASSIGNOR TO
E. V. DOUGLAS, OF PHILADELPHIA, PENNSYLVANIA.

METHOD OF PRODUCING CARBID OF CALCIUM.

SPECIFICATION forming part of Letters Patent No. 628,806, dated July 11, 1899.

Application filed April 19, 1898. Serial No. 678,133. (No specimens.)

*To all whom it may concern:*

Be it known that I, WILLIAM SMITH HORRY, a subject of Her Majesty the Queen of Great Britain, residing at Sault Ste. Marie, Michigan, have invented a new and useful Method of Producing Carbid of Calcium, of which the following is a specification.

The objects of the invention are to provide for the production of calcium carbid of uniform grade and quality and to increase the output of the finished product, and to these and other ends the invention comprises the improvement hereinafter described and claimed.

In the practice of the invention buried portions of the charge are reduced for the production of a pool of calcium carbid. This is done by feeding the charge around and passing the current between electrodes arranged substantially parallel and vertical and buried in the charge. The described position of the electrodes is productive of several beneficial results. For example, it permits of the feeding of the charge all around them, it protects them from the air, thereby increasing the length of their lives, it presents their tips in proper relation to the surface of the pool, and it insures above their tips the presence of a mass of the incoming charge, toward which they direct escaping gases. A considerable portion of the heat generated is retained and utilized to maintain the pool of carbid in a molten condition until it spreads laterally beyond the field of reduction by keeping the charge around and above the electrodes of sufficient depth for this purpose. An advantage of this is that carbid of calcium is produced in relatively large cross-sectional area and of substantially uniform quality. Successive portions of the charge are brought into the field of reduction for the described treatment by shifting the carbid and charge and electrodes vertically with respect to each other.

The process may be practiced by means of a variety of apparatus, of which a few examples have been illustrated in the accompanying drawings, forming part hereof, and in which—

Figures 1, 2, and 3 are elevational views illustrating, principally in central section, electric furnaces by means of which the process may be successfully practiced and clearly explained.

In what is believed to be the best embodiment of apparatus for the practice of the invention there is an open-top receptacle, vessel, or wall for receiving and containing the material or charge to be acted upon and for conveying gas through such material or charge. In Fig. 1, 1 is such a receptacle. In Fig. 2, 2 is such a receptacle. In Fig. 3, 3 is such a receptacle. In each case the receptacle is open for the escape of gas at its top, and it is adapted to contain material or a charge 4, which is to be acted upon. There are also in the furnace pencils P and N of opposite polarity, or, in other words, between which the current passes, and the circuit, either direct or alternating, is completed. These pencils extend below the top of the charge and within the receptacle, and they are arranged clear of its side walls, so that their tips may be deeply buried in the material or charge 4, as shown. Use may also be made of pencil-holders 5, which are located inside of the side walls of the receptacle, so that jets of gas following the pencils and pencil-holders do not escape through the side walls of the receptacle, as would be the case if the holders projected or extended through the side walls. The circuit connections are indicated at 6 and 7. To strike or start the arc, the electrodes are connected by a high-resistance conductor, which may be accomplished by placing between the pencils powdered coke or the like and then charging the furnace with the carbid-producing materials. In the subsequent operation there is produced a pool 10 of fluid carbid of calcium, which is traversed by the current of electricity. This pool is at the zone of greatest temperature, and its surface is substantially level, and the material or charge 4, preheated by the escaping gases, falls all around the electrodes into this pool, which spreads out, as shown, because the superimposed charge by reason of its depth retains a considerable portion of the heat generated, and thereby maintains the pool of carbid in a molten condition until it spreads laterally beyond the field of reduction. Thus the pool fills the receptacle and receives the incoming charge. Since the top of the pool is level, it follows that the pencils should be vertical and therefore parallel, or substantially so, and they should also be clear of the side walls in order to permit the material or charge 4 to fall all around them into the pool, as described.

To practice the described process and to cause the pool to occupy at all times the zone of highest temperature and to fill the receptacle with calcium carbid, means which shift the carbid and charge and electrodes vertically the one in respect to the other should be provided in order to bring successive portions of the charge into the field of reduction. Such means are susceptible of different embodiments. For example, in the furnace shown in Fig. 1 the carbid and part of the charge are shifted vertically (in the sense that they travel upon the arc of a large circle tangent to the line of the electrodes) away from or toward the electrodes, and the chamber or receptacle at the left-hand side of the figure is built up by the addition of suitable side and face plates. In the furnace shown in Fig. 2 the described movement may be effected, because the bottom 8 is moved vertically. As shown in Fig. 3, the pencils are adjusted in respect to the receptacle—for example, by moving the receptacle vertically downward, and parts, as 9, may be added.

In the operation the pool spreads out laterally and practically fills the receptacle, is substantially maintained in the zone of highest temperature, and receives the incoming material, which falls all around the electrodes, so that the product is produced under the same conditions, and consequently its grade and quality are practically uniform.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

The method of making calcium carbid which consists in arranging electrodes of opposite polarity in a substantially vertical position and adjacent to each other, feeding a suitable charge of raw material around the electrodes, causing an electric current to flow between the electrodes thereby reducing adjacent portions of the charge and producing an initial pool of carbid, keeping the charge around the electrodes of such depth as to retain a considerable portion of the heat generated and thereby maintaining the pool of carbid in a molten condition until it spreads out laterally beyond the field of reduction, and shifting the carbid and charge vertically with respect to the electrodes to bring successive portions of the charge into the field of reduction.

In testimony whereof I have hereunto signed my name.

WILLIAM SMITH HORRY.

In presence of—
SAML. G. CARLTON,
WM. R. KENAN, Jr.